(12) United States Patent
Van Wiemeersch et al.

(10) Patent No.: US 10,821,788 B2
(45) Date of Patent: Nov. 3, 2020

(54) ACTIVATION OF TIRE PRESSURE MEASUREMENT SYSTEMS

(71) Applicant: Ford Global Technologies, LLC, Dearborn, MI (US)

(72) Inventors: John Robert Van Wiemeersch, Novi, MI (US); Ali Hassani, Ann Arbor, MI (US); Dilip B. Patel, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/876,998

(22) Filed: Jan. 22, 2018

(65) Prior Publication Data

US 2019/0225034 A1 Jul. 25, 2019

(51) Int. Cl.
*B60C 23/00* (2006.01)
*B60C 23/04* (2006.01)

(52) U.S. Cl.
CPC ...... *B60C 23/0471* (2013.01); *B60C 23/0406* (2013.01); *B60C 23/0418* (2013.01)

(58) Field of Classification Search
CPC .................. B60C 23/0471; B60C 23/0406
See application file for complete search history.

(56) References Cited

U.S. PATENT DOCUMENTS

| | | | |
|---|---|---|---|
| 8,344,869 B2 | 1/2013 | Lickfelt | |
| 8,437,916 B2* | 5/2013 | Fawaz | G08C 17/02 455/418 |
| 9,794,753 B1* | 10/2017 | Stitt | H04B 17/318 |
| 9,950,577 B1* | 4/2018 | Marlett | B60C 23/0416 |
| 2005/0083174 A1* | 4/2005 | Nakamura | B60R 25/246 340/5.72 |
| 2005/0195072 A1 | 9/2005 | Yamazaki | |
| 2008/0117079 A1* | 5/2008 | Hassan | B60R 25/045 340/901 |
| 2014/0107946 A1* | 4/2014 | Kandler | B60C 11/246 702/34 |
| 2014/0368326 A1* | 12/2014 | Vassilieff | G07C 9/00309 340/442 |
| 2016/0096402 A1* | 4/2016 | Carlin | H04W 4/14 340/442 |
| 2017/0040911 A1* | 2/2017 | Tatarchuk | H01L 41/18 |
| 2018/0151949 A1* | 5/2018 | Lin | H01Q 1/3233 |

FOREIGN PATENT DOCUMENTS

CN 106739861 A 5/2017
EP 3093166 A1 11/2016

* cited by examiner

*Primary Examiner* — Jamel E Williams
(74) *Attorney, Agent, or Firm* — Frank Lollo; Eversheds Sutherland (US) LLP (57) ABSTRACT

Method and apparatus are disclosed for activation of tire pressure measurement systems. An example vehicle includes a door including a handle sensor, a tire pressure measurement system (TPMS) sensor, a communication module, a display, and a controller. The controller is to activate the TPMS sensor responsive to detecting, via the handle sensor, engagement of a handle and collect, via the communication module, a measurement from the TPMS sensor upon activation. The controller also is to present, via the display, a low-pressure alert in response to determining the measurement is less than a threshold.

15 Claims, 4 Drawing Sheets

ACTIVATION OF TIRE PRESSURE MEASUREMENT SYSTEMS

TECHNICAL FIELD

The present disclosure generally relates to tire pressure and, more specifically, to activation of tire pressure measurement systems.

BACKGROUND

Typically, vehicles include tires that are coupled to respective wheel rims. Generally, the tires are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of a vehicle. Recently, vehicles have implemented tire pressure monitoring systems (TPMS sensors) that monitor tire pressures and/or other characteristics of the tires. For instance, a vehicle may include a tire pressure sensor for each tire of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for activation of tire pressure measurement systems. An example disclosed vehicle includes a door including a handle sensor, a tire pressure measurement system (TPMS) sensor, a communication module, a display, and a controller. The controller is to activate the TPMS sensor responsive to detecting, via the handle sensor, engagement of a handle and collect, via the communication module, a measurement from the TPMS sensor upon activation. The controller also is to present, via the display, a low-pressure alert in response to determining the measurement is less than a threshold.

In some examples, the controller presents, via the display, a high-pressure alert in response to determining the measurement is greater than a second threshold. In some examples, the controller is configured to collect the measurement from the TPMS sensor before a vehicle engine is started. In some such examples, the TPMS sensor communicates with the communication module at a reduced rate before vehicle tires are in motion. In some examples, the controller is configured to activate, localize, collect measurements from, and present low energy alerts based on a plurality of TPMS sensors for a respective plurality of vehicle tires. In some examples, the communication module communicates with the TPMS sensor via a Bluetooth® low-energy communication protocol to collect the measurement from the TPMS sensor. In some examples, to activate the TPMS sensor and collect the measurement from the TPMS sensor, the controller is configured to send a low-frequency wake-up signal to the TPMS sensor via the communication module, establish Bluetooth® low-energy communication between the communication module and the TPMS sensor upon the TPMS sensor receiving the low-frequency wake-up signal, send an instruction to the TPMS sensor via the Bluetooth® low-energy communication to collect the measurement, and receive the measurement from the TPMS sensor via the Bluetooth® low-energy communication. In some examples, the controller is configured to send, via the communication module, a signal to a mobile device of a user to present at least one of the measurement and the low-pressure alert via the mobile device.

Some examples further include a keypad of the door. In such examples, the controller is configured to activate the TPMS sensor responsive to the keypad receiving a passcode. Some examples further include a liftgate and a liftgate sensor. In such examples, the controller is configured to activate the TPMS sensor responsive to the liftgate sensor detecting a request to open the liftgate. Some examples further include a door-ajar sensor. In such examples, the controller is configured to activate the TPMS sensor responsive to the door-ajar sensor responsive to detecting that the door is opening. In some examples, the controller is configured to activate the TPMS sensor upon identifying at least one of an upcoming scheduled start and an upcoming predicted start for a vehicle engine. Some examples further include a temperature sensor. In such examples, the controller is configured to activate the TPMS sensor responsive to the temperature sensor detecting a decrease in temperature over a predetermined period of time that exceeds a temperature change threshold. In some examples, the controller is configured to activate the TPMS sensor responsive to the communication module receiving a car-finder signal from a mobile device of a user. In some examples, the controller is configured to activate the TPMS sensor responsive to the communication module receiving at least one of a remote start signal and a remote unlock signal from a mobile device of a user. In some examples, the controller is configured to activate the TPMS sensor responsive to the communication module receiving a signal from a nearby garage door communication module indicating that a garage door is opening. In some examples, the controller is configured to activate the TPMS sensor responsive to detecting that a mobile device of a user is within a threshold distance for passive entry into a vehicle cabin.

An example disclosed method includes activating, via a processor, a tire pressure measurement system (TPMS) sensor of a vehicle responsive to detecting, via a handle sensor, engagement of a handle of a door of the vehicle. The example disclosed method also includes collecting, via a communication module of the vehicle, a measurement from the TPMS sensor upon activation and presenting, via a display, a low-pressure alert in response to determining the measurement is less than a threshold.

Some examples further include activating the TPMS sensor responsive to a keypad of the door receiving a passcode. Some examples further include activating the TPMS sensor responsive to the communication module receiving a signal from a mobile device of a user. In such examples, the signal includes at least one of a car-finder signal, a remote start signal, and a remote unlock signal.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include tires that are coupled to respective wheel rims. Generally, the tires are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of a vehicle. Recently, vehicles have implemented tire pressure monitoring systems (TPMS sensors) that monitor tire pressures and/or other characteristics of the tires. For instance, a vehicle may include a tire pressure sensor for each tire of the vehicle. In such instances, if one of the tire pressure sensors detects a low tire pressure, a cluster output device of the vehicle is activated to alert an operator (e.g., a driver) of the vehicle to the low tire pressure. Oftentimes, the tire pressure sensors collect tire pressure measurements once every ten minutes. As a result, a vehicle potentially may be driving along a road for an extended period of time upon being started before the operator is alerted to a low or high tire pressure of a tire.

Example methods and apparatus disclosed herein activate tire pressure measurement system (TPMS) sensors of a vehicle into a temporary low-energy-consumption state upon detecting an event indicating that a user will soon begin operating the vehicle. Further, the methods and apparatus disclosed herein present any alerts (e.g., low-pressure alerts, high tire-pressure alerts) before the user begins operating motive functions of the vehicle. In turn, the methods and apparatus disclosed herein alert the user to any deflated tire before the user begins operating motive functions of the vehicle without draining batteries of the TPMS sensors and/or the vehicle.

Examples disclosed herein include a TPMS controller that activates TPMS sensors of a vehicle that were in a low-energy stand-by state upon detecting an upcoming initiation events of the vehicle. For example, upcoming initiation events detected by the TPMS controller include (i) receiving a remote start signal, (ii) receiving a remote unlock signal, (iii) receiving a scheduled start signal, (iv) receiving a predicted start signal (e.g., identified based on driving history data, calendar data, etc.), (v) receiving a car-finder signal, (vi) detecting a passive entry signal, (vii) receiving a passive start signal, (viii) otherwise detecting an approaching mobile device (e.g., a key fob, a phone-as-a-key) of a designated user of the vehicle, (ix) detecting that a nearby garage door has been opened, (x) detecting a decrease in temperature, (xi) receiving a passcode from a keypad of the vehicle, and (xii) detecting that a user has grasped a door handle of the vehicle. To activate the TPMS sensors when in the low-energy state, the TPMS controller emits a low-frequency wake-up signal for the TPMS sensors, establishes communication with the TPMS sensors via a Bluetooth® low-energy and/or other communication protocol, and sends an instruction to the TPMS sensors via the established communication pairings to collect tire pressure data. Upon being activated in the low-energy state, the TPMS sensors collect tire pressure data and report the collected tire pressure data to the TPMS controller via the established communication pairings at a reduced rate relative to that when the TPMS sensors are activated in a driving state (e.g., when the vehicle wheels are rotating above a predetermined speed, such as 6 kilometers per hour). The TPMS controller presents the tire pressure data and/or pressure alerts (e.g., low-pressure alerts, high-pressure alerts) to the user via an output device of the vehicle and/or a mobile device of the user.

As used herein, a "remote unlock" system and a "remote-unlock" system refer to a system of a vehicle that unlock(s) one or more doors of the vehicle upon receiving a remote unlock signal from a key fob and/or a phone-as-a-key of a user of the vehicle. Some remote unlock systems may trigger unlock a door for opening in response a remote unlock signal such that the door unlocks upon detecting that a user has touched or activated the unlock/unlatch switch of a handle of the door. As used herein, a "remote start" system and a "remote-start" system refer to a system of a vehicle that starts an engine of the vehicle upon receiving a remote start signal from a key fob and/or a phone-as-a-key of a user of the vehicle and/or a telematics command sent to the vehicle.

As used herein, "passive entry" and "passive-entry" refer to a system of a vehicle that unlock(s) and/or open(s) one or more doors of the vehicle upon detecting that a key fob and/or a phone-as-a-key is proximate to and/or approaching a door of the vehicle. Some passive entry systems unlock and/or open a door in response to detecting a key fob and/or a phone-as-a-key. Further, some passive entry systems trigger a door for opening in response to detecting a key fob and/or a phone-as-a-key such that the door unlocks upon detecting that a user has touched or actuated a handle of the door. As used herein, "passive start" and "passive-start" refer to a system of a vehicle that activates ignition of an engine of the vehicle upon detecting that a key fob and/or a phone-as-a-key is within a cabin of the vehicle (e.g., such that drive-away is enabled). Some passive start systems activate ignition of the engine in response to detecting a key fob and/or a phone-as-a-key. Further, some passive start systems trigger an engine for ignition in response to detecting a key fob and/or a phone-as-a-key such that the ignition of the engine is started when an ignition button within the cabin of the vehicle is pressed.

As used herein, a "key fob" refers to a mobile device that wirelessly communicates with a vehicle to unlock and/or lock one or more vehicle doors, open and/or close one or more of the vehicle doors, activate an engine of the vehicle, and/or initiate other function(s) of the vehicle. In some examples, a user of a vehicle utilizes a mobile device that functions as a phone-as-a-key for wireless communication with the vehicle. As used herein, a "phone-as-a-key" refers to a mobile device (e.g., a smart phone, a wearable, a smart watch, a tablet, etc.) that includes hardware and/or software to function as a key fob.

Figure 1:
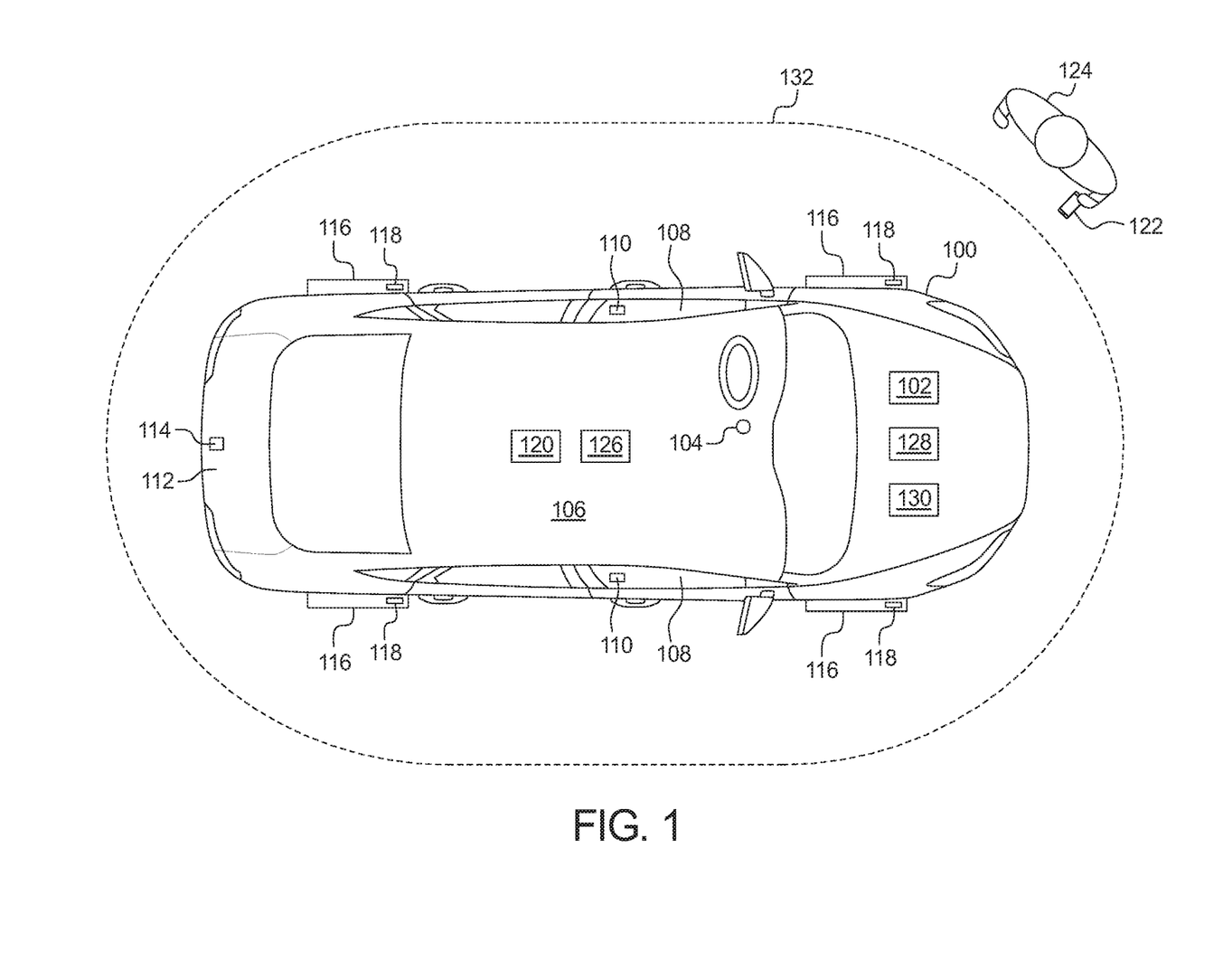
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes an engine 102 and an ignition switch 104. For example, the engine 102 includes an internal combustion engine, an electric motor, a hybrid engine and/or any other power source that propels movement of the vehicle 100. Further, the ignition switch 104 enables an operator (e.g., a driver) of the vehicle 100 to operate the engine 102, a battery, and/or electronic accessories of the vehicle 100. In some examples, the ignition switch 104 includes an on-position, a start position, and an off-position. Further, the ignition switch 104 may be a rotary switch and/or a pushbutton that transitions between the ignition switch positions (e.g., the on-position, the start position, the off-position, the accessory position, etc.).

The vehicle 100 of the illustrated example includes a cabin 106, one or more doors 108, and one or more door-ajar sensors 110. For example, the doors 108 enable a person to enter and/or exit from the cabin 106 of the vehicle 100. Each of the door-ajar sensors 110 detects whether a corresponding one of the doors 108 is in an open state or closed state. In some examples, each of the doors 108 includes a corresponding one of the door-ajar sensors 110. In some examples, less than all of the doors 108 includes a corresponding one of the door-ajar sensors 110.

Further, the vehicle 100 of the illustrated example includes a liftgate 112 and a liftgate sensor 114. For example, the liftgate 112 is a door or panel that opens upwardly to provide access to a cargo compartment located at a rear of the vehicle 100. The liftgate sensor 114 is configured to detect a request to open the liftgate 112 via a hands-free liftgate system. For example, the liftgate sensor 114 (e.g., a capacitive sensor) is positioned on and/or next to the liftgate 112 to monitor an activation area near the liftgate 112. When a person extends at least a portion of his or her leg (e.g., a foot) into the activation area, the liftgate sensor 114 detects a request to open the liftgate 112 via the hands-free liftgate system.

As illustrated in FIG. 1, the vehicle 100 includes tires 116 and tire pressure management system (TPMS) sensors 118. For example, the tires 116 are coupled to respective wheel rims of the vehicle 100. In some examples, the tires 116 are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of the vehicle 100. Further, in some examples, the tires 116 include treads (i.e., grooved patterns) on their outer surfaces to further improve handling during operation of the vehicle 100.

The TPMS sensors 118 of the illustrated example include circuitry configured to determine tire pressures and/or other characteristics of the tires 116. For example, each of the TPMS sensors 118 include one or more processors and/or memory that may enable the TPMS sensors 118 to carry out one or more functions. Each of the TPMS sensors 118 also include a pressure sensor to detect a tire pressure of the corresponding one of the tires 116. Further, each of the TPMS sensors 118 includes circuitry to facilitate communication with one or more devices or systems, such as a communication module 120 of vehicle 100. For example, each of the TPMS sensors 118 include antenna(s) that are configured to (i) receive and transmit data collected from a pressure sensor and/or other sensor(s) of the TPMS sensors 118 and (ii) receive signals (e.g., activation signals, wake-up signals, pairing signals, instructions, etc.) from the communication module 120 of the vehicle 100. The antenna(s) and/or communication module of each of the TPMS sensors 118 enable communication with the communication module 120 of the vehicle 100 via low-frequency signals, high-frequency signals, ultra high frequency (e.g., 315 MHz and/or 433 MHz) signals, Ultra-Wide Band (UWB) signals, Bluetooth® communication protocol, Bluetooth® Low Energy (BLE) protocol, Wi-Fi communication protocol (e.g., IEEE 802.11 a/b/g/n/ac), etc.

The communication module 120 of the illustrated example is configured to communicatively connect to a mobile device 122 (e.g., a key fob and/or a phone-as-a-key) of a user 124 of the vehicle 100. The communication module 120 includes hardware and firmware to establish a wireless connection with the mobile device 122. For example, the communication module 120 includes a wireless personal area network (WPAN) module that wirelessly communicates with mobile device(s) of user(s) (e.g., the mobile device 122 of the user 124) via short-range wireless communication protocol(s). In some examples, the communication module 120 implements the Bluetooth® and/or BLE protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 120 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the communication module 120 to communicatively couple to the mobile device 122 of the user 124.

Further, the vehicle 100 includes a communication module 126 that includes wired or wireless network interfaces to enable communication with external networks. Communication module 126 also includes hardware (e.g., processors, memory, storage, antenna, etc.) and software to control the wired or wireless network interfaces. In the illustrated example, the communication module 126 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), etc.). In some examples, the communication module 126 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The vehicle 100 of the illustrated example also includes a temperature sensor 128. For example, the temperature sensor 128 measures a current temperature of a surrounding environment of the vehicle 100 and/or calculates a change in temperature (e.g., an increase, a decrease) over a period of time based upon temperature measurements taken over that time period.

Further, the vehicle 100 includes a TPMS controller 130. For example, the TPMS controller 130 is configured to activate, localize, collect measurements from, and present low-energy alert(s) based on the TPMS sensors 118 of the respective tires 116. That is, the TPMS controller 130 collects tire pressure measurements from the TPMS sensors 118 of the vehicle 100, compares the collected tire pressure measurements to tire pressure thresholds, and presents an alert (e.g., a low-pressure alert, a high-pressure alert to the user 124). For example, the TPMS controller 130 presents a low-pressure alert when one or more of the tire pressure measurements is less than a first tire pressure threshold (e.g., a low pressure threshold) and presents a high-pressure alert when one or more of the tire pressure measurements is greater than a second tire pressure threshold (e.g., a high pressure threshold). The tire pressure threshold may correspond to a factory-recommended lower and/or upper limits of a tire pressure for the tires 116 and/or the vehicle 100.

In the illustrated example, the TPMS sensors 118 are configured to be in a sleep mode (also referred to as a stationary mode), an active mode (also referred to as a driving mode), and a low-energy mode. The TPMS controller 130 monitors characteristics of the vehicle 100 to determine in which mode to set the TPMS sensors 118.

The TPMS sensors 118 are set in sleep mode upon determining that the vehicle 100 has been stationary for a predetermined period of time (e.g., 5 minutes, 10 minutes, etc.). The vehicle 100 may be stationary for the predetermined period of time when the vehicle 100 is parked and/or when the vehicle 100 is stuck in traffic. For example, one or more of the TPMS sensors 118 of the vehicle 100 includes a sensor (e.g., a gyroscope, an accelerometer) to detect rotation of the corresponding one of the tires 116. That is, the sensors detect movement of the tires 116. When the sensors detect that the tires 116 are stationary, the TPMS sensors 118 detect that the vehicle 100 is stationary. If the TPMS controller 130 determines that the vehicle 100 is stationary for the predetermined period of time, the TPMS sensors 118 are set in sleep mode. Further, when the TPMS sensors 118 are in sleep mode, the pressure sensors of the TPMS sensors 118 collect tire pressure measurements at extended intervals (e.g., once every 6 hours) to reduce the amount of energy consumed by the TPMS sensors 118 over a period of time.

The TPMS sensors 118 are set in active mode upon determining that the vehicle 100 is moving. For example, the TPMS sensors 118 detect that the vehicle 100 is moving when the sensors detect that the tires 116 are rotating. The TPMS sensors 118 are activated for monitoring the tires 116 upon transitioning to the active mode from the sleep mode and/or the low-energy mode. For example, to activate the TPMS sensors 118, communication is established between the TPMS sensors 118 and the communication module 120 of the vehicle 100 to pair the TPMS sensors 118 to the communication module 120 and/or other communication module(s) of the vehicle 100. For example, the TPMS controller 130 pairs the TPMS sensors 118 to the communication module 120 via BLE, Bluetooth®, Wi-Fi®, UWB, and/or any other communication protocol. Upon pairing the TPMS sensors 118, the TPMS controller 130 sends an instruction, via the communication module 120, to the TPMS sensors 118 to instruct the TPMS sensors 118 to collect tire pressure measurements from the tires 116.

Further, the TPMS controller 130 localizes the tires 116 based on the communication between the TPMS sensors 118 and the communication module 120. That is, the TPMS controller 130 identifies the location of each of the TPMS sensors 118 and the corresponding tires 116 based on the communication between the TPMS sensors 118 and the communication module 120. For example, the TPMS controller 130 identifies which of the TPMS sensors 118 is located at a front driver-side wheel well, a front passenger-side wheel well, a rear driver-side wheel well, and a rear passenger-side wheel well. In some examples, the TPMS controller 130 determines locations of the TPMS sensors 118 based upon received signal strength indicators (RSSIs), time-of-flight, and/or angle-of-arrival of signals sent between the TPMS sensors 118 and the communication module 120 and/or other communication module(s) located throughout the vehicle 100. For example, the TPMS controller 130 utilizes triangulation and/or trilateration to localize the TPMS sensors 118 based upon the RSSIs, time-of-flight, and/or angle-of-arrival of signals sent between the TPMS sensors 118 and the plurality of communication modules.

When the TPMS sensors 118 are in active mode, the pressure sensors of the TPMS sensors 118 collect tire pressure measurements at short intervals (e.g., once every minute) to enable the TPMS sensors 118 to quickly detect a drop in air pressure of the tires 116 while the vehicle 100 is moving. For example, by collecting tire pressure measurements at short intervals, the TPMS sensors 118 are able to detect a puncture to one of the tires 116 while the vehicle 100 is traveling along a road. Upon collecting the tire pressure measurements, the TPMS sensors 118 send the tire pressure measurements to the TPMS controller 130 via the communication module 120 of the vehicle 100. For example, the communication module 120 communicates with the TPMS sensors 118 via BLE communication, Bluetooth® communication, Wi-Fi® Communication, UWB communication, and/or any other communication protocol to collect the tire pressure measurements from the TPMS sensors 118. Further, the TPMS controller 130 compares the tire pressure measurements to a tire pressure threshold corresponding to the tires 116 and/or the vehicle 100. In response to determining that one or more of the tire pressure measurements is less than a first tire pressure threshold (e.g., a low pressure threshold), the TPMS controller 130 presents a low-pressure alert to the user 124 (e.g., via a display 418 of an infotainment head unit 404 of FIG. 4). Further, in response to determining that one or more of the tire pressure measurements is greater than a second tire pressure threshold (e.g., a high pressure threshold), the TPMS controller 130 presents a high-pressure alert to the user 124.

Further, the TPMS sensors 118 of the illustrated example are set in low-energy mode upon detection of a pre-driving event that is configured to trigger the TPMS sensors 118 into the low-energy mode. When the TPMS sensors 118 are in the low-energy mode, the TPMS sensors 118 collect tire pressure measurements of the tires 116 at reduced intervals (e.g., once every 5 minutes, 10 minutes, etc.) to reduce an amount of energy consumed by the TPMS sensors 118 before the engine 102 is activated for a driving event. For example, in the low-energy mode, the TPMS controller 130 is configured to collect the tire pressure measurements from the TPMS sensors 118 before the engine 102 is started and/or the TPMS sensors 118 communicates the tire pressure measurements with the communication module 120 before the engine 102 has started. That is, the TPMS controller 130 is configured to activate the TPMS sensors 118 in a low-energy state in response to detecting a pre-driving event to enable the user 124 to receive a low-pressure alert before the user 124 begins operating motive functions of the vehicle 100. For example, the TPMS controller 130 activates the TPMS sensors 118 in the low-energy state upon detecting a pre-driving event associated with a high likelihood that the user 124 will begin operating motive functions of the vehicle 100 within a short period of time (e.g., 5 minutes, 10 minutes, 30 minutes, etc.).

In some examples, the pre-driving event that triggers activation of the TPMS sensors 118 into the low-energy state corresponds with the user 124 entering the cabin 106 of the vehicle 100. For example, the TPMS controller 130 is configured to activate the TPMS sensors 118 into low-energy mode in response to (i) one or more of the door-ajar sensors 110 detecting that one or more of the doors 108 has been opened, (ii) the liftgate sensor 114 detecting a request to open the liftgate 112, (iii) receiving an unlock signal from the mobile device 122 (e.g., upon the user 124 pressing an unlock button), and/or (iv) detecting that the mobile device 122 of the user 124 is approaching one of the doors 108 (e.g., for passive entry into the cabin 106, for passive start of the engine 102). For example, the TPMS controller 130 determines that the user 124 is approaching the vehicle 100 upon detecting that the mobile device 122 is within a threshold distance 132 of the vehicle 100 (e.g., via RSSI, time-of-flight, angle-of-arrival, GPS). In some examples, to further reduce energy consumption caused by the TPMS sensors 118, the TPMS controller 130 is configured to activate the TPMS sensors 118 into low-energy mode in response to detecting that the mobile device 122 is approaching the vehicle 100 only at times of the day when the user 124 has historically operated the vehicle 100.

In some examples, the pre-driving event corresponds with a signal sent form the mobile device 122 of the user 124. For example, the TPMS controller 130 is configured to activate the TPMS sensors 118 into low-energy mode in response to the communication module 120 of the vehicle 100 receiving (i) a remote start signal, (ii) a remote unlock signal, (iii) two remote lock signals quickly in succession when the vehicle 100 has been stationary for a predetermined period of time (e.g., 5 minutes, 10 minutes, etc.) (iv) a car-finder signal, and/or (v) a panic signal from the mobile device 122 of the user 124. Additionally or alternatively, the TPMS controller 130 is configured to activate the TPMS sensors 118 into low-energy mode in response to receiving a passive entry signal, and/or a passive start signal.

Further, in some examples, the pre-driving event corresponds to other events that occur when the engine 102 of the vehicle 100 is inactive. For example, the TPMS controller 130 is configured to activate the TPMS sensors 118 into low-energy mode in response to (i) the TPMS controller 130 identifying an upcoming scheduled start (e.g., within the next 5 minutes, 10 minutes, etc.) of the engine 102, (ii) the TPMS controller 130 identifying an upcoming predicted start (e.g., within the next 5 minutes, 10 minutes, etc.) of the engine 102, (iii) the temperature sensor 128 detecting a decrease in temperature over a predetermined period of time that exceeds a temperature change threshold, (iv) the TPMS controller 130 detecting (e.g., via an ignition switch sensor 426 of FIG. 4) that the user 124 has turned the ignition switch 104 into an on-state, (v) a trunk-ajar sensor detecting that a trunk of the vehicle 100 has been opened, and/or (vi) the TPMS controller 130 identifying an instruction to open windows of the vehicle 100. For example, the TPMS controller 130 may identify predicted starts based upon historical use data of the vehicle 100 (e.g., stored in memory 414 of FIG. 4), a calendar of the user 124 (e.g., stored in the memory 414, retrieved from a remote server, retrieved from a nearby smart home assistant, etc.)

In the illustrated example, to activate the TPMS sensors 118 into the low-energy mode, the TPMS controller 130 sends, via the communication module 120, a low-energy wake-up signal to the TPMS sensors 118 upon detecting a pre-driving event corresponding to the low-energy mode. Subsequently, the TPMS controller 130 establishes a communication between the TPMS sensors 118 and the communication module 120 upon the TPMS sensors 118 receiving the low-energy wake-up signal. For example, communication is established between the TPMS sensors 118 and the communication module 120 of the vehicle 100 to pair the TPMS sensors 118 to the communication module 120 and/or other communication module(s) of the vehicle 100. The TPMS controller 130 pairs the TPMS sensors 118 to establish BLE communication, Bluetooth® communication, Wi-Fi® communication, UWB communication, and/or any other form of communication between the TPMS sensors 118 and the communication module 120. Upon pairing the TPMS sensors 118 for communication with the communication module 120, the TPMS controller 130 sends an instruction, via the communication module 120 (e.g., via BLE, Bluetooth®, Wi-Fi®, UWB, etc.), to the TPMS sensors 118 to instruct the TPMS sensors 118 to collect tire pressure measurements from the tires 116.

The TPMS controller 130 also localizes the tires 116 based on the communication between the TPMS sensors 118 and the communication module 120. For example, the TPMS controller 130 determines locations of the TPMS sensors 118 based upon RSSIs, time-of-flight, and/or angle-of-arrival of signals sent between the TPMS sensors 118 and the communication module 120 and/or other communication module(s) located throughout the vehicle 100. For example, the TPMS controller 130 utilizes triangulation and/or trilateration to localize the TPMS sensors 118 based upon received signal strength indicators (RSSIs), time-of-flight, and/or angle-of-arrival of signals sent between the TPMS sensors 118 and the plurality of communication modules.

When the TPMS sensors 118 are in the low-energy mode, the pressure sensors of the TPMS sensors 118 collect tire pressure measurements at reduced intervals (e.g., once every 5 minutes, 10 minutes, etc.) to reduce an amount of energy consumed while monitoring the tire pressure of the tires 116. Upon collecting the tire pressure measurements, the TPMS sensors 118 send the tire pressure measurements to the TPMS controller 130 via the communication module 120 of the vehicle 100. That is, the TPMS controller 130 collects the tire pressure measurements from the TPMS sensors 118 via the communication module 120. For example, the communication module 120 receives the tire pressure measurements from the TPMS sensors 118 via BLE communication, Bluetooth® communication, Wi-Fi® Communication, UWB communication, and/or any other communication protocol to collect the tire pressure measurements from the TPMS sensors 118.

Further, the TPMS controller 130 of the illustrated example compares the tire pressure measurements to a tire pressure threshold corresponding to the tires 116 and/or the vehicle 100. The TPMS controller 130 is configured to present a low-pressure alert to the user 124 (e.g., via a display 418 of an infotainment head unit 404 of FIG. 4) in response to determining that one or more of the tire pressure measurements is less than a first tire pressure threshold and/or greater than a second tire pressure threshold. In some examples, the TPMS controller 130 is configured to present a low-pressure alert and/or tire pressure measurement(s) via a display (e.g., a display 418 of FIG. 4), speakers (e.g., speakers 420 of FIG. 4), and/or any other output device of the vehicle 100 upon identifying a low tire pressure for one of the tires 116. Further, in some examples, the TPMS controller 130 stores (e.g., via memory 414 of FIG. 4) the tire pressure measurement(s) and/or low-pressure alert until the user 124 has entered the cabin 106 of the vehicle 100 and/or the engine 102 of the vehicle 100 is activated. In such examples, the TPMS controller 130 presents the tire pressure measurement(s) and/or low-pressure alert via the output device(s) of the vehicle 100 upon detecting that the user 124 is within the cabin 106 and/or the engine 102 has started. Additionally or alternatively, the TPMS controller 130 sends a signal to the mobile device 122 of the user 124, via the communication module 120, to present the tire pressure measurement(s) and/or low-pressure alert to the user 124 via the mobile device 122. For example, the TPMS controller 130 instructs the mobile device 122 to present tire pressure measurement(s) and/or low-pressure alert to enable the user 124 to determine whether one or more of the tires 116 has a low pressure before entering the cabin 106 and operating the vehicle 100.

Figure 2:
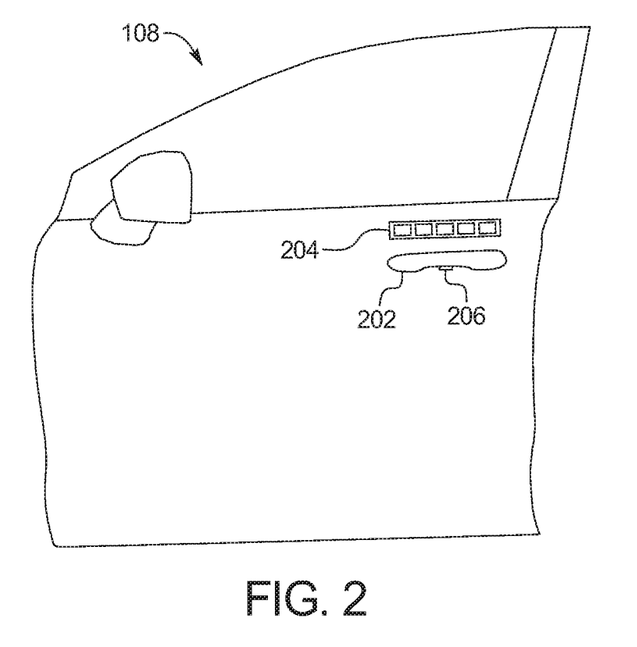
FIG. 2 illustrates a door of the vehicle of FIG. 1.

FIG. 2 illustrates one of the doors 108 of the vehicle 100. As illustrated in FIG. 2, the door 108 includes a handle 202 (also referred to as a door handle) and a keypad 204. The handle 202 enables the user 124 to open and/or close the door 108, for example, as the user 124 enters and/or exits the cabin 106 of the vehicle 100. The user 124 grasps and/or otherwise engages the door 108 to open and/or close the door 108.

As illustrated in FIG. 2, the keypad 204 includes buttons for receiving a code from the user 124. The buttons of the keypad 204 are labeled with characters (e.g., numeric characters, alphabetic characters, alphanumeric characters) to enable the user 124 to identify each of the buttons. For example, one button of the keypad may be labeled "1-2," another button may be labeled "3-4," another button may be labeled "5-6," another button may be labeled "7-8," and another button may be labeled "9-0" to enable the user 124 to enter a numeric code. While the keypad 204 of the illustrated example is located on the door 108, the keypad 204 may be located at any other location along an exterior surface of the vehicle 100. Additionally or alternatively, the keypad 204 may be a virtual keypad whose buttons are projected onto a window of the door 108 and/or other window(s) of the vehicle 100.

Further, the door 108 includes a handle sensor 206 (also referred to as a door handle sensor) that monitors the handle 202. For example, the handle sensor 206 detects when the handle 202 is engaged (e.g., by the user 124). The handle sensor 206 is a capacitive sensor, a paddle switch, and/or any other sensor or switch that is configured to detect when the handle 202 is engaged. In some examples, the vehicle 100 includes a passive entry system in which the doors 108 is unlocked upon handle sensor 206 detecting that handle 202 has been grasped and/or other engaged (e.g., by the user 124).

In some examples, the pre-driving event that triggers activation of the TPMS sensors 118 into the low-energy state corresponds with the user 124 interacting with the door 108 to enter the cabin 106 of the vehicle 100. For example, the TPMS controller 130 is configured to activate the TPMS sensors 118 into low-energy mode in response to (i) the keypad 204 receiving a passcode from the user 124, (ii) the handle sensor 206 detecting engagement of the handle 202 by the user 124, and/or (iii) a sensor of the vehicle 100 detecting biometric characteristics of the user 124 when the user 123 is near the door 108.

Figure 3:
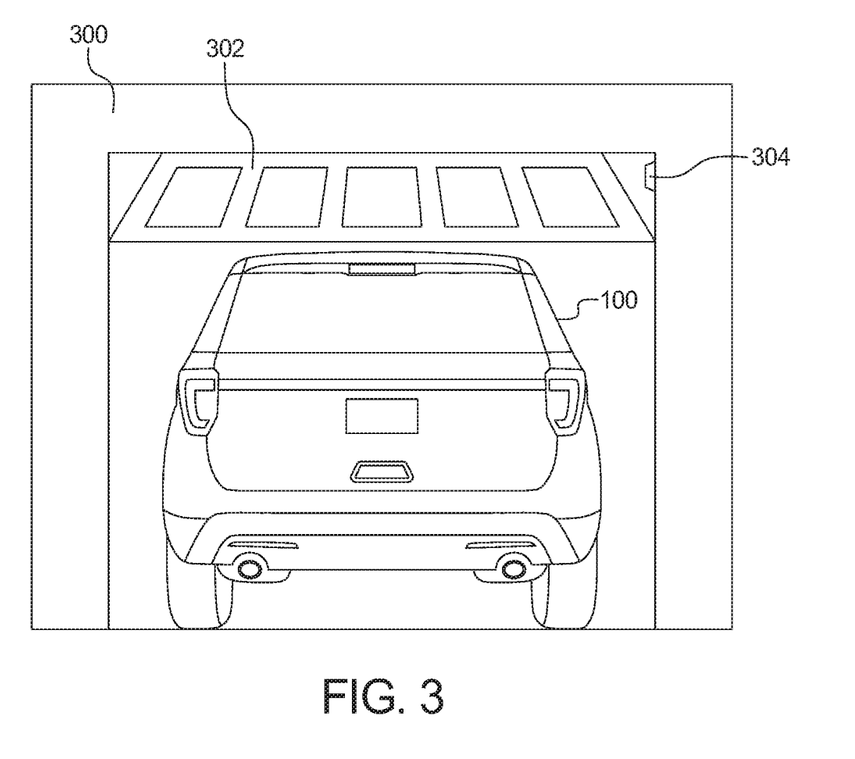
FIG. 3 illustrates the vehicle of FIG. 1 while located in a garage.

FIG. 3 illustrates the vehicle 100 while located in a garage 300. The garage 300 includes a garage door that opens and closes to enable and prevent, respectively, access to the garage 300. In the illustrated example, the garage door 302 is in the process of opening or closing such that the garage door 302 is partially open. In some examples, the user 124 presses a button on a remote device (e.g., a dedicated garage remote, a fob, and/or another mobile device) to initiate opening and/or closing of the garage door 302. Additionally or alternatively, the user 124 presses a button on a stationary device (e.g., located on a wall of the garage 300) to initiate opening and/or closing of the garage door 302. In the illustrated example, the stationary device of the garage 300 includes a communication module 304 (also referred to as a garage door communication module, a garage communication module, a garage door module, or a garage module). For example, the communication module 304 sends a signal to a controller of the garage door 302 to initiate opening and/or closing of the garage door 302.

In the illustrated example, the communication module 304 includes hardware and firmware to establish a wireless connection with the communication module 120 of the vehicle 100. For example, the communication module 304 includes a wireless personal area network (WPAN) module that wirelessly communicates with the communication module 120 of the vehicle 100 via short-range wireless communication protocol(s). In some examples, the communication module 304 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 304 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the communication module 304 to communicatively couple to the communication module 120 of the vehicle 100. Further, the communication module 304 may include one or more communication controllers for cellular networks, Near Field Communication (NFC) and/or other standards-based networks.

In some examples, the pre-driving event that triggers activation of the TPMS sensors 118 into the low-energy state corresponds with the garage door 302. For example, the TPMS controller 130 is configured to activate the TPMS sensors 118 into low-energy mode in response to the TPMS controller 130 detecting that the vehicle 100 is located within the garage 300 and receiving a signal from the communication module 304 that indicates the garage door 302 is opening. In some examples, the TPMS controller 130 determines that the vehicle 100 is located within the garage 300 via a GPS receiver, camera(s), and/or proximity sensor(s) of the vehicle 100. Additionally or alternatively, the TPMS controller 130 determines that the vehicle 100 is located within the garage 300 based upon an RSSI, time-of-flight, and/or angle-of-operation of signals communicated between the communication module 120 of the vehicle 100 and the communication module 304 of the garage 300.

Further, in some examples, to prevent unintended activation of the TPMS sensors 118 when the user 124 is home and the vehicle 100 is parked in the garage 300, the TPMS controller 130 does not activate the TPMS sensors 118 into low-energy mode upon identifying that the garage door 302 is opening if the TPMS controller 130 does not detect the mobile device 122 within the threshold distance 132. In some examples, the threshold distance 132 is reduced if the TPMS controller 130 detects that the vehicle 100 is parked at the home of the user 124. Additionally or alternatively, the TPMS controller 130 prevents unintended activation of the TPMS sensors 118 when the user 124 is home and multiple vehicles are parked in and/or near the garage 300 by only activating the TPMS sensors 118 of the last vehicle (e.g., the vehicle 100) that was operated by the user 124 associated with the mobile device 122.

Figure 4:
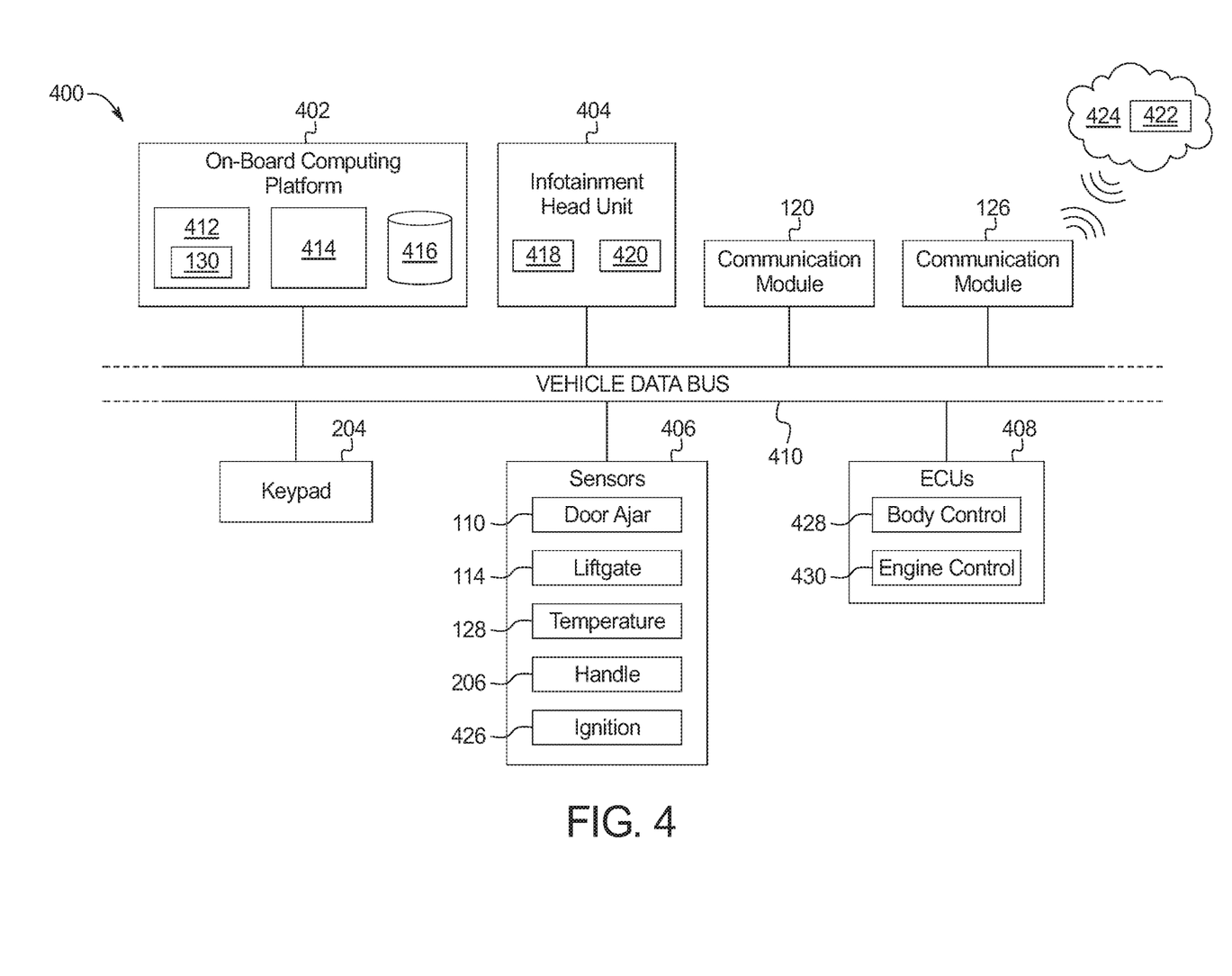
FIG. 4 is a block diagram of electronic components of the vehicle of FIG. 1.

FIG. 4 is a block diagram of electronic components 400 of the vehicle 100. As illustrated in FIG. 4, the electronic components 400 include an on-board computing platform 402, an infotainment head unit 404, the communication module 120, the communication module 126, the keypad 204, sensors 406, electronic control units (ECUs) 408, and a vehicle data bus 410.

The on-board computing platform 402 includes a microcontroller unit, controller or processor 412; memory 414, and a database 416. In some examples, the processor 412 of the on-board computing platform 402 is structured to include the TPMS controller 130. Alternatively, in some examples, the TPMS controller 130 is incorporated into another electronic control unit (ECU) with its own processor 412, memory 414, and/or database 416. The database 416 stores, for example, entries that correlate various characteristics (e.g., a time, a day, a month, a temperature, a location, etc.) to a scheduled and/or predicted start time of the engine 102 of the vehicle 100. For example, the TPMS controller 130 identifies a scheduled start time and/or a predicted start time for the vehicle 100 based on the time, the day, the month, the temperature, the location, etc.

The processor 412 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 414 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 414 includes multiple kinds of memory, particularly volatile memory and non-volatile memory.

The memory 414 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 414, the computer readable medium, and/or within the processor 412 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 404 provides an interface between the vehicle 100 and the user. The infotainment head unit 404 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include actuators, a display 418 (e.g., a cluster output, a heads-up display, a center console display such as a liquid crystal display (LCD), an organic light emitting diode (OLED) display, a flat panel display, a solid state display, etc.), and/or speakers 420. For example, the infotainment head unit 404 includes hardware (e.g., a processor or controller, memory, storage, etc.) and software (e.g., an operating system, etc.) for an infotainment system (such as SYNC® and MyFord Touch® by Ford®). Additionally, the infotainment head unit 404 displays the infotainment system on, for example, a center console display. In the illustrated example, the TPMS controller 130 is configured to present low-pressure alert(s) to the user 124 via the display 418, the speakers 420, and/or any other output device of the infotainment head unit 404.

As illustrated in FIG. 4, the communication module 126 wirelessly communicates with a server 422 of a network 424. For example, the communication module 126 retrieves a scheduled start time, a predicted start time, surrounding weather conditions, a GPS location, and/or other information corresponding to the vehicle 100 from the server 422 of the network 424 to enable the TPMS controller 130 to determine whether to activate the TPMS sensors 118 in a low-energy state and/or a driving state.

The sensors 406 are arranged in and around the vehicle 100 to monitor properties of the vehicle 100 and/or an environment in which the vehicle 100 is located. One or more of the sensors 406 may be mounted to measure properties around an exterior of the vehicle 100. Additionally or alternatively, one or more of the sensors 406 may be mounted inside a cabin of the vehicle 100 or in a body of the vehicle 100 (e.g., an engine compartment, wheel wells, etc.) to measure properties in an interior of the vehicle 100. For example, the sensors 406 include accelerometers, odometers, tachometers, pitch and yaw sensors, wheel speed sensors, microphones, tire pressure sensors, biometric sensors and/or sensors of any other suitable type.

In the illustrated example, the sensors 406 include the door-ajar sensors 110, the liftgate sensor 114, the temperature sensor 128, the handle sensor 206, and an ignition switch sensor 426. For example, the door-ajar sensors 110 detect whether the doors 108 are open or closed, and the liftgate sensor 114 monitors for a request to open the liftgate 112 via a hands-free liftgate system, the temperature sensor 128 detect an ambient temperature surrounding the vehicle 100, and the handle sensor 206 detects when the handle 202 is engaged (e.g., by the user 124). Further, the ignition switch sensor 426 detects a position of the ignition switch 104. For example, the ignition switch sensor 426 detects whether the ignition switch 104 is in an on-position, a start position, an off-position, or an accessory position.

The ECUs 408 monitor and control the subsystems of the vehicle 100. For example, the ECUs 408 are discrete sets of electronics that include their own circuit(s) (e.g., integrated circuits, microprocessors, memory, storage, etc.) and firmware, sensors, actuators, and/or mounting hardware. The ECUs 408 communicate and exchange information via a vehicle data bus (e.g., the vehicle data bus 410). Additionally, the ECUs 408 may communicate properties (e.g., status of the ECUs 408, sensor readings, control state, error and diagnostic codes, etc.) to and/or receive requests from each other. For example, the vehicle 100 may have seventy or more of the ECUs 408 that are positioned in various locations around the vehicle 100 and are communicatively coupled by the vehicle data bus 410.

In the illustrated example, the ECUs 408 include a body control module 428 and a engine control unit 430. For example, the body control module 428 controls one or more subsystems throughout the vehicle 100, such as power windows, power locks, an immobilizer system, power mirrors, etc. For example, the body control module 428 includes circuits that drive one or more of relays (e.g., to control wiper fluid, etc.), brushed direct current (DC) motors (e.g., to control power seats, power locks, power windows, wipers, etc.), stepper motors, LEDs, etc. Further, the engine control unit 430 control(s) operation (e.g., remote starting, passive starting, ignition switch starting) of the engine 102 of the vehicle 100.

The vehicle data bus 410 communicatively couples the communication module 120, the communication module 126, the keypad 204, the on-board computing platform 402, the infotainment head unit 404, the sensors 406, and the ECUs 408. In some examples, the vehicle data bus 410 includes one or more data buses. The vehicle data bus 410 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
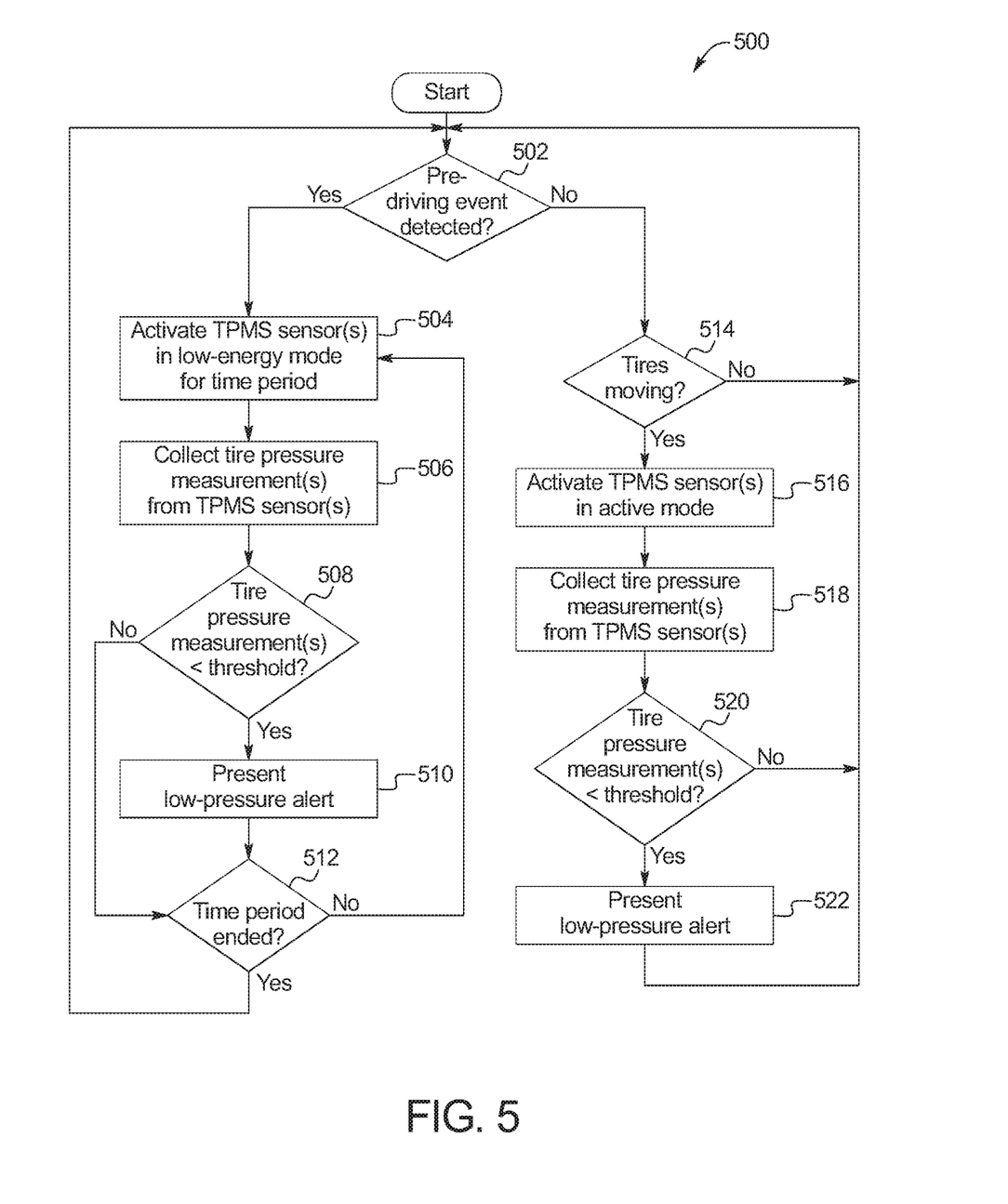
FIG. 5 is a flowchart for activating tire pressure measurement systems of a vehicle in accordance with the teachings herein.

FIG. 5 is a flowchart of an example method 500 to activate tire pressure measurement systems of a vehicle. The flowchart of FIG. 5 is representative of machine readable instructions that are stored in memory (such as the memory 414 of FIG. 4) and include one or more programs which, when executed by a processor (such as the processor 412 of FIG. 4), cause the vehicle 100 to implement the example TPMS controller 130 of FIGS. 1 and 4. While the example program is described with reference to the flowchart illustrated in FIG. 5, many other methods of implementing the example TPMS controller 130 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the TPMS controller 130 determines whether a pre-driving event corresponding to a low-energy state has been detected. In response to the TPMS controller 130 determining that a pre-driving event has not been detected, the method 500 proceeds to block 514. Otherwise, in response to the TPMS controller 130 determining that a pre-driving event has been detected, the method 500 proceeds to block 504.

At block 504, the TPMS controller 130 activates the TPMS sensors 118 into low-energy mode. For example, the TPMS controller 130 activates the TPMS sensors 118 to enable the TPMS sensors 118 to collect tire pressure measurements of the tires 116. At block 506, the TPMS controller 130 collects the tire pressure measurements from the TPMS sensors 118 via the communication module 120 of the vehicle 100. At block 508, the TPMS controller 130 determines whether one or more of the tire pressure measurements is less than a tire pressure threshold that corresponds to the tires 116 and/or the vehicle 100. In response to the TPMS controller 130 determining that one or more of the tire pressure measurements is less than the tire pressure threshold, the method 500 proceeds to block 510 at which the TPMS controller 130 presents a low-pressure alert for the user 124. For example, the TPMS controller 130 presents the low-pressure alert via the mobile device 122, the display 418, the speakers 420, and/or any other output device of the vehicle 100. Otherwise, in response to the TPMS controller 130 determining that the tire pressure measurements are not less than the tire pressure threshold, the method 500 proceeds to block 512.

At block 512, the TPMS controller 130 determines whether a predetermined time period of the low-energy mode has ended. In response to the TPMS controller 130 determining that the predetermined time period has not ended, the method 500 returns to block 504 as the TPMS sensors 118 remain the low-energy mode. Otherwise, in response to the TPMS controller 130 determining that the predetermined time period has ended, the method 500 returns to block 502. For example, the TPMS controller 130 returns the TPMS sensors 118 to sleep mode as the method 500 returns to block 502. Further, in some examples, the TPMS controller 130 transitions the TPMS sensors 118 from low-energy mode to active mode in response to detecting that the tires 116 have begun moving when the TPMS sensors 118 were in low-energy mode.

Returning to block 514, the TPMS controller 130 determines whether the tires 116 of the vehicle 100 are moving. For example, the TPMS controller 130 determines whether the tires 116 are moving via sensors (e.g., gyroscopes, accelerometers) of the TPMS sensors 118. In response to the TPMS controller 130 determining that the tires 116 are not moving, the method 500 returns to block 502. In some examples, the TPMS controller 130 maintains the TPMS sensors 118 in sleep mode as the method 500 returns to block 502. Otherwise, in response to the TPMS controller 130 determining that the tires 116 are moving, the method 500 proceeds to block 516. At block 516, the TPMS controller 130 activates the TPMS sensors 118 into active mode. For example, the TPMS controller 130 activates the TPMS sensors 118 to enable the TPMS sensors 118 to collect tire pressure measurements of the tires 116. At block 518, the TPMS controller 130 collects the tire pressure measurements from the TPMS sensors 118 via the communication module 120 of the vehicle 100.

At block 520, the TPMS controller 130 determines whether one or more of the tire pressure measurements is less than the tire pressure threshold. In response to the TPMS controller 130 determining that the tire pressure measurements are not less than the tire pressure threshold, the method 500 returns to block 502. Otherwise, in response to the TPMS controller 130 determining that one or more of the tire pressure measurements is less than the tire pressure threshold, the method 500 proceeds to block 522 at which the TPMS controller 130 presents a low-pressure alert for the user 124. For example, the TPMS controller 130 presents the low-pressure alert via the mobile device 122, the display 418, the speakers 420, and/or any other output device of the vehicle 100.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a door including a handle sensor;
a tire pressure measurement system (TPMS) sensor;
a communication module;
a display; and
a controller to:
activate the TPMS sensor upon identifying at least one of an upcoming scheduled start or an upcoming predicted start for a vehicle engine;
activate the TPMS sensor responsive to detecting, via the handle sensor, engagement of a handle;
collect, via the communication module, a measurement from the TPMS sensor upon activation before a vehicle engine is started, wherein the TPMS sensor communicates with the communication module at a reduced rate before vehicle tires are in motion; and
present, via the display, a low-pressure alert in response to determining the measurement is less than a threshold.

2. The vehicle of claim 1, wherein the controller presents, via the display, a high-pressure alert in response to determining the measurement is greater than a second threshold.

3. The vehicle of claim 1, wherein the controller is configured to activate, localize, collect measurements from, and present low energy alerts based on a plurality of TPMS sensors for a respective plurality of vehicle tires.

4. The vehicle of claim 1, wherein the communication module communicates with the TPMS sensor via a Bluetooth® low-energy communication protocol to collect the measurement from the TPMS sensor.

5. The vehicle of claim 1, further including a temperature sensor, wherein the controller is configured to activate the TPMS sensor responsive to the temperature sensor detecting a decrease in temperature over a predetermined period of time that exceeds a temperature change threshold.

6. The vehicle of claim 1, wherein the controller is configured to activate the TPMS sensor responsive to the communication module receiving a car-finder signal from a mobile device of a user.

7. The vehicle of claim 1, wherein the controller is configured to activate the TPMS sensor responsive to the communication module receiving at least one of a remote start signal and a remote unlock signal from a mobile device of a user.

8. A vehicle, comprising:
a door including a handle sensor;
a door-ajar sensor;
a tire pressure measurement system (TPMS) sensor;
a communication module;
a display; and
a controller to:
activate the TPMS sensor responsive to the door-ajar sensor detecting that the door is opening;
activate the TPMS sensor responsive to detecting, via the handle sensor, engagement of a handle;
collect, via the communication module, a measurement from the TPMS sensor upon activation; and
present, via the display, a low-pressure alert in response to determining the measurement is less than a threshold.

9. The vehicle of claim 8, wherein the controller is configured to collect the measurement from the TPMS sensor before a vehicle engine is started.

10. The vehicle of claim 9, wherein the TPMS sensor communicates with the communication module at a reduced rate before vehicle tires are in motion.

11. The vehicle of claim 8, wherein, to activate the TPMS sensor and collect the measurement from the TPMS sensor, the controller is configured to:
send a low-frequency wake-up signal to the TPMS sensor via the communication module;
establish Bluetooth® low-energy communication between the communication module and the TPMS sensor upon the TPMS sensor receiving the low-frequency wake-up signal;
send an instruction to the TPMS sensor via the Bluetooth® low-energy communication to collect the measurement; and
receive the measurement from the TPMS sensor via the Bluetooth® low-energy communication.

12. The vehicle of claim 8, wherein the controller is configured to send, via the communication module, a signal to a mobile device of a user to present at least one of the measurement and the low-pressure alert via the mobile device.

13. The vehicle of claim 8, further including a keypad of the door, wherein the controller is configured to activate the TPMS sensor responsive to the keypad receiving a passcode.

14. The vehicle of claim 8, further including a liftgate and a liftgate sensor, wherein the controller is configured to activate the TPMS sensor responsive to the liftgate sensor detecting a request to open the liftgate.

15. A vehicle, comprising:
a door including a handle sensor;
a tire pressure measurement system (TPMS) sensor;
a communication module;
a display; and
a controller to:
activate the TPMS sensor responsive to detecting, via the handle sensor, engagement of a handle;

activate the TPMS sensor responsive to detecting that a mobile device of a user is within a threshold distance for passive entry into a vehicle cabin;

activate the TPMS sensor responsive to the communication module receiving a signal from a nearby garage door communication module indicating that a garage door is opening;

collect, via the communication module, a measurement from the TPMS sensor upon activation; and present, via the display, a low-pressure alert in response to determining the measurement is less than a threshold.

* * * * *